(12) United States Patent
Simpson

(10) Patent No.: US 6,448,678 B1
(45) Date of Patent: Sep. 10, 2002

(54) HVAC MOTOR WITH BRUSH CARD ASSEMBLY HAVING INTEGRATED COVER SUPPORT STRUCTURE

(75) Inventor: Stan Simpson, St. Thomas (CA)

(73) Assignee: Siemens Automotive, Inc., Mississauga (CA)

( * ) Notice: Subject to any disclaimer, the term of this patent is extended or adjusted under 35 U.S.C. 154(b) by 0 days.

(21) Appl. No.: 09/948,364

(22) Filed: Sep. 7, 2001

(51) Int. Cl.⁷ .................................................. H02K 5/00
(52) U.S. Cl. ........................................... 310/89; 310/51
(58) Field of Search ............................ 310/239, 89, 51; 29/826, 596

(56) References Cited

U.S. PATENT DOCUMENTS

| | | | | |
|---|---|---|---|---|
| 3,143,284 A | * | 8/1964 | Lindsjo et al. .............. 248/606 |
| 5,576,586 A | * | 11/1996 | Blumenberg ................ 310/239 |
| 5,786,647 A | * | 7/1998 | Vollmer et al. .............. 310/51 |
| 5,883,451 A | * | 3/1999 | Majchrzak et al. ........... 310/58 |
| 6,262,504 B1 | * | 7/2001 | Bartlett ........................ 310/58 |

\* cited by examiner

*Primary Examiner*—Tran Nguyen
*Assistant Examiner*—Nguyen Hanh

(57) ABSTRACT

A motor is provided which is configured to have at least a portion thereof received in an interior of a cover to reduce noise of the motor. The interior is defined by an inner peripheral surface of the cover. The motor includes a generally cylindrical housing having a closed end and an opened end disposed opposite the closed end. A brush card assembly is provided and includes a brush card and a cover support structure coupled with the brush card. The brush card and cover support structure close the opened end of the housing. The cover support structure has a plurality of resilient members extending from the opened end towards the closed end of the housing, with each resilient member being generally adjacent to an outer surface of the housing and being biased away from the outer surface of the housing. The resilient members are constructed and arranged such that when at least a portion of the motor is placed in the interior of a cover, the resilient members engage the inner peripheral surface of the cover to dampen vibration of the motor.

17 Claims, 5 Drawing Sheets

HVAC MOTOR WITH BRUSH CARD ASSEMBLY HAVING INTEGRATED COVER SUPPORT STRUCTURE

FIELD OF THE INVENTION

This invention relates to an HVAC motor for an automotive HVAC system and more particularly to an HVAC motor having a brush card assembly with an integrated cover support structure for supporting a cover which covers a portion of the motor to reduce motor noise.

BACKGROUND OF THE INVENTION

A typical HVAC motor assembly is supported in a scroll which has an air inlet and an air discharge such that a portion of air flow moved by a blower wheel driven by the motor is diverted to a tube or channel to cool the motor. FIG. 1 shows, in an unassembled condition, a conventional HVAC motor assembly 10 for use in driving a blower wheel to force air to flow through an automotive HVAC system. The assembly 10 includes a motor 12 having a generally cylindrical portion 14. A one-piece cover, generally indicated at 16, is preferably molded from plastic. The cover 16 has a generally cylindrical section 18 having an opening at one end 20 thereof and a closed end 22 opposite end 20. The opening is sized to receive the motor 12 such that the motor 12 can be disposed in the cylindrical section 18 of the cover 16. A vibration damping member in the form of a rubber band 24 is provided between the cylindrical portion 14 of the motor 12 and the inner surface of the cylindrical section 18 of the cover 16. The vibration damping member 24 contacts the inner surface of the cylindrical section 18 and the periphery of the cylindrical portion 14 of the motor 12 to dampen vibration of the motor 12.

Although the motor assembly 10 is effective in operation, the cost of the assembly can be reduced by reducing the number of components. Furthermore, at times it may be difficult to stretch the rubber band 24 to place it over the cylindrical portion 14 of the motor 12. There is also a possibility of rejected parts from the rubber band 24 rolling up under the cover 16 during processing.

Accordingly, there is a need to provide an improved HVAC motor assembly which has fewer components than the conventional motor assembly, yet is effective in reducing vibration and thus the overall noise.

SUMMARY OF THE INVENTION

An object of the present invention is to fulfill the need referred to above. In accordance with the principles of the present invention, this objective is obtained by providing a motor which is configured to have at least a portion thereof received in an interior of a cover to reduce noise of the motor. The interior is defined by an inner peripheral surface of the cover. The motor includes a generally cylindrical housing having a closed end and an opened end disposed opposite the closed end. A brush card assembly is provided and includes a brush card and a cover support structure coupled with the brush card. The brush card and cover support structure close the opened end of the housing. The cover support structure has a plurality of resilient members extending from the opened end towards the closed end of the housing, with each resilient member being generally adjacent to an outer surface of the housing and being biased away from the outer surface of the housing. The resilient members are constructed and arranged such that when at least a portion of the motor is placed in the interior of a cover, the resilient members engage the inner peripheral surface of the cover to dampen vibration of the motor.

In accordance with another aspect of the invention, a method of assembling an HVAC motor assembly provides a motor having a generally cylindrical housing having a closed end and an opened end disposed opposite the closed end. The motor includes a brush card assembly comprising a brush card and a cover support structure coupled with the brush card, the brush card and cover support structure close the opened end of the housing. The cover support structure has a plurality of resilient members extending from the opened end towards the closed end of the housing, with each resilient member being generally adjacent to an outer surface of the housing and being biased away from the outer surface of the housing. A cover is provided including a generally cylindrical section having an opening at one end thereof and a closed end opposite the one end. An inner peripheral surface defines an interior between the ends. At least a portion of the motor is placed in the interior so that a substantial portion of the housing is covered by the cover to reduce noise of the motor, with the resilient members being engaged with the inner peripheral surface of the cover to dampen vibration of the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE PREFERRED EMBODIMENT

Figure 1:
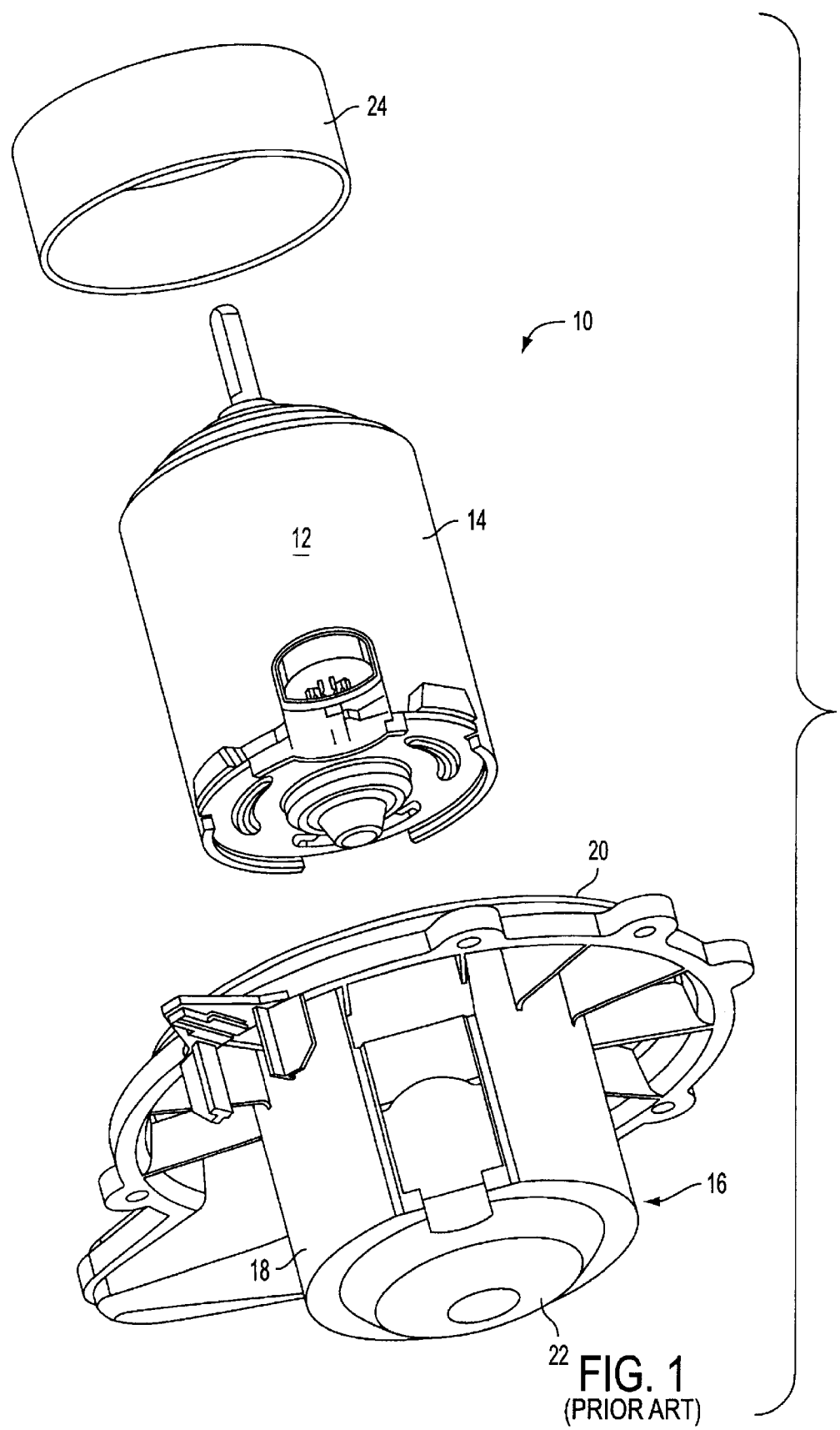
FIG. 1 is a view of components of a conventional HVAC motor assembly shown in an unassembled condition.
Figure 2:
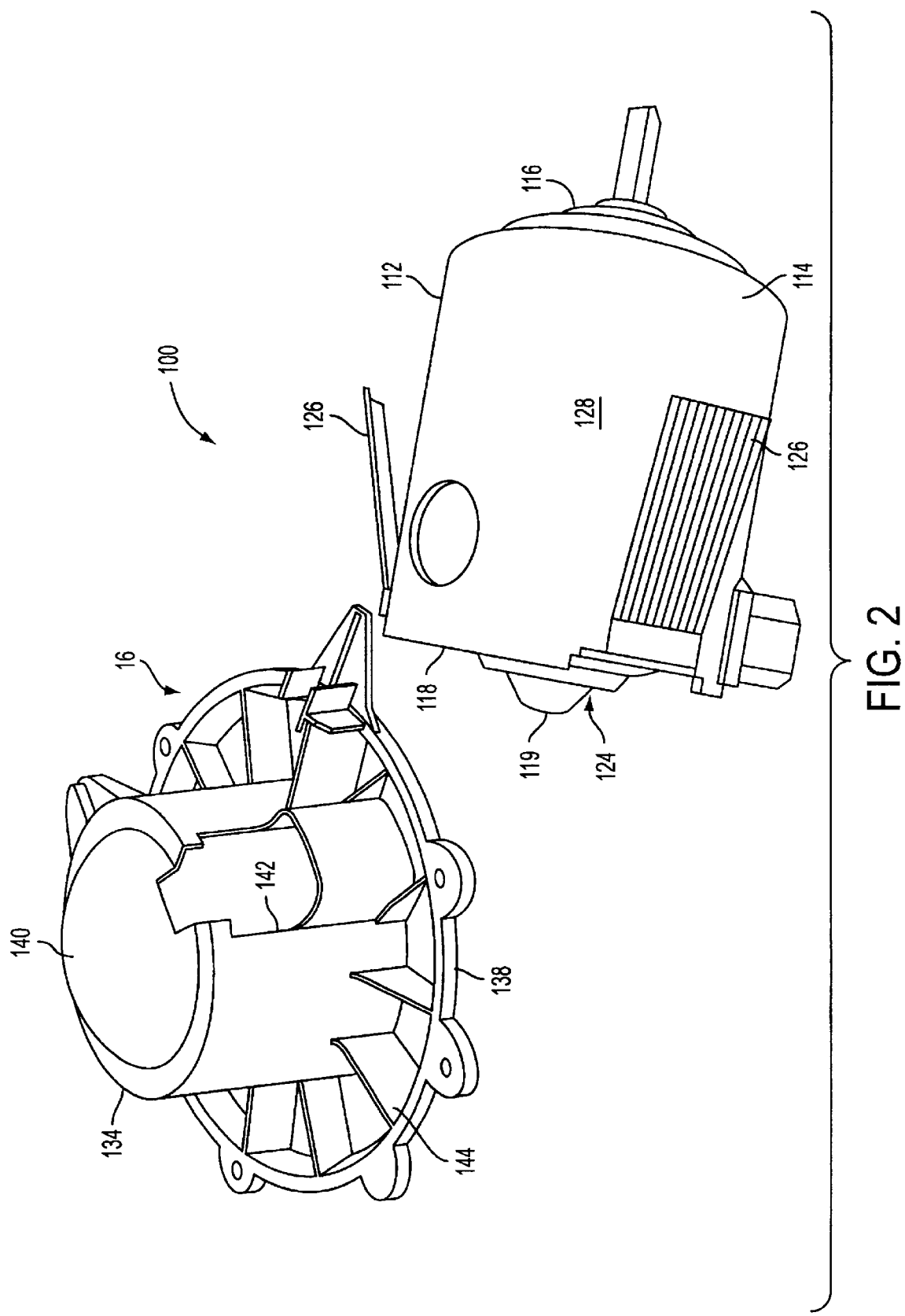
FIG. 2 is an exploded view of a motor and cover of an HVAC motor assembly provided in accordance with the principles of the present invention.
Figure 3:
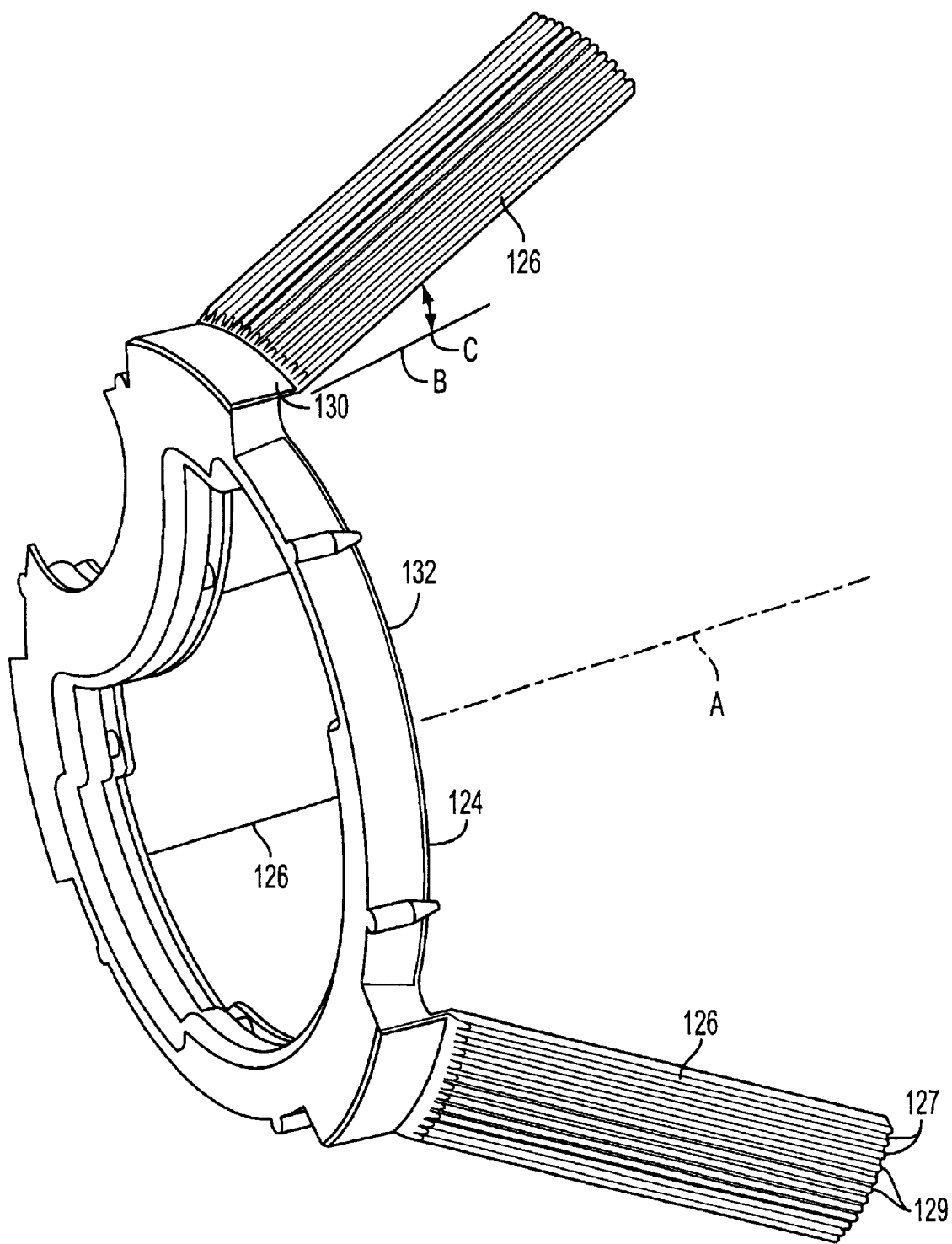
FIG. 3 is a perspective view of a cover support structure provided in accordance with the principles of the present invention.
Figure 4:
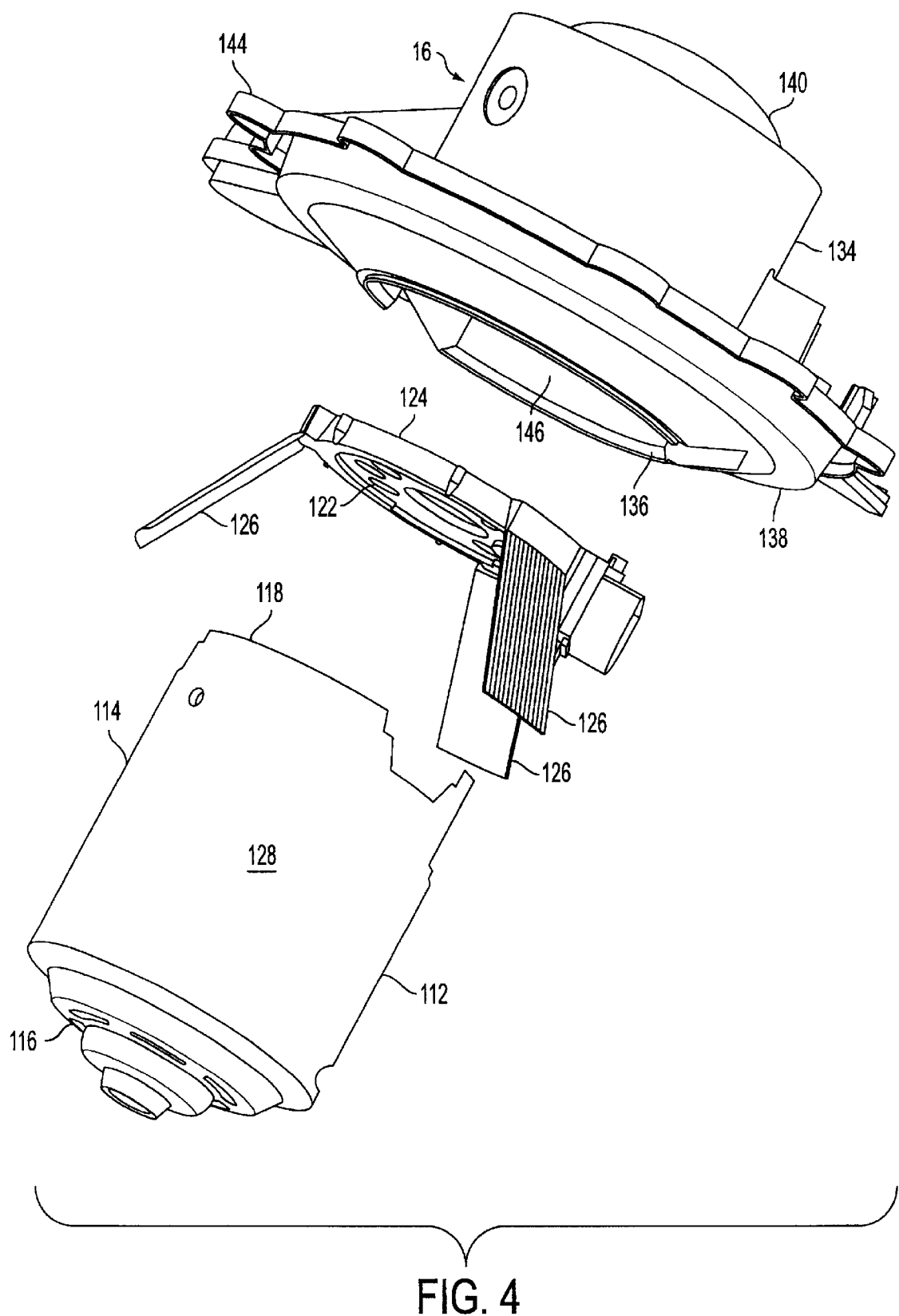
FIG. 4 is an exploded view of a motor housing, brush card assembly with integrated cover support structure, and a cover of the HVAC motor assembly of the invention.
Figure 5:
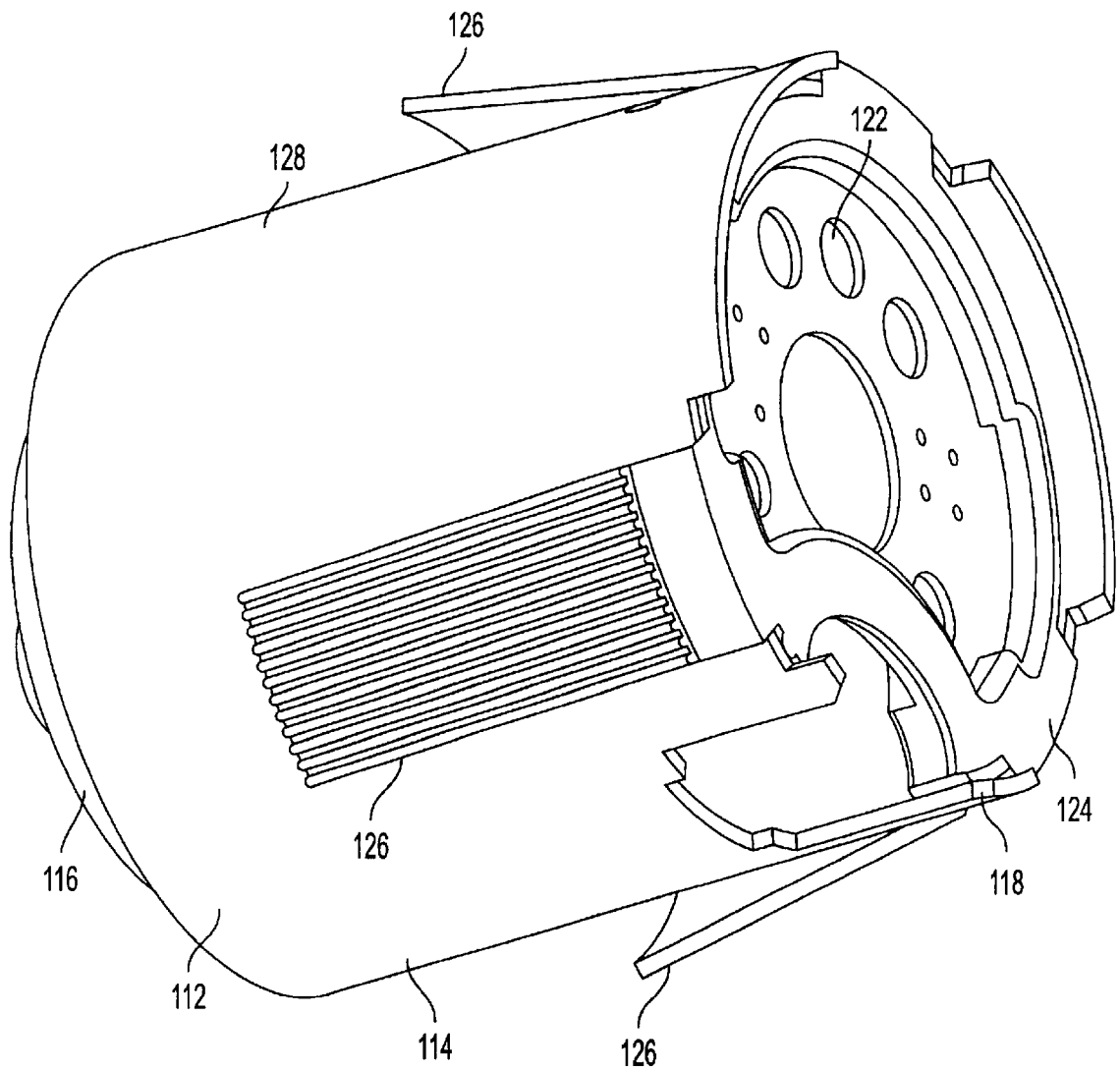
FIG. 5 is a perspective view of a motor assembly of the invention having a brush card with integrated cover support structure.

Referring to FIG. 2, an HVAC motor assembly, provided in accordance with the principles of the present invention, is shown generally indicated at 100. The motor assembly 100 comprises a motor 112 having a generally cylindrical portion 114 with a closed end 116 and an opened end 118 disposed opposite the closed end 116. The motor 112 includes a brush card assembly 12 (FIGS. 4 and 5) comprising a brush card 122 and a cover support structure 124 made integral with the brush card 122. The brush card 122 and cover support structure 124 close the opened end 118 of the housing. In assembly, the brush card is inserted into the opened end 118 of the housing 114 to close the opened end 118. Thereafter, the cover support structure 124 is molded from plastic, preferably during an over-molding process, so as to be formed over a portion of the bush card 122 and a portion of the motor housing 114. However, it can be appreciated that the cover support structure may be molded in a separate process and then attached so as to be integral with the brush card 122. As shown in FIGS. 2, 3 and 5, the cover support structure 124 includes a generally cylindrical base 132 coupled to the brush card 122 and defining a central axis A. The cover support structure 124 also includes resilient members 126 extending from the base 132 generally in the direction of the central axis A. With reference to FIG. 5, the resilient members 126 are generally rectangular and extend from the opened end 118 towards the closed end 116 of the housing 114. A surface of each resilient member 126 has a plurality of grooves 127 therein with a raised portion 129 being disposed between pairs of grooves 127. The grooves 127 and raised portions 129 extend the entire length of each resilient member 127 and function to dissipate vibration.

Each resilient member 126 is disposed generally adjacent to an outer surface 128 of the housing 114 and is biased away from the outer surface 128 of the housing due to a hinge connection 130 of the resilient member 126 with the base 132 of the cover support structure 124. Thus, the resilient members 126 will move easily about hinge 130 towards the outer surface 128 of the housing 114 to promote insertion of the motor 112 into a cover 16 yet will naturally move away from the outer surface 128 when in a relaxed condition, as will be explained more fully below. As best shown in FIG. 5, in the relaxed condition, each resilient member 126 extends from the base 132 so as to be offset from a line B parallel to the central axis A an angle C of about 10 degrees.

The motor assembly 100 includes a conventional cover, generally indicated at 16, preferably molded as a single part from polypropylene 60% barium sulfate. As best shown in FIGS. 2 and 4, the cover 16 includes a generally cylindrical section 134 having an opening 136 at one end 138 thereof and a closed end 140 opposite end 138. An interior 142 is defined between the ends 138 and 140. A flange structure 144 extends from the cylindrical section 134 for mounting of the HVAC motor assembly 100.

In accordance with the invention, the cover support structure 124 defines a vibration damping member between the cylindrical housing 114 of the motor 112 and the inner surface 146 of the cylindrical section 134 of the cover 16. As the motor 12 is inserted into the open end 136 of the cover 16, the resilient members move about hinge 130 thereof towards the outer surface 128 of the motor permitting the insertion of the motor and resilient members 126. When the resilient members are entirely within the interior 138 of the cover 16, the resilient members 126 engage the inner surface 146 of the cylindrical section 122 to dampen vibration of the motor. The raised portions 129 of the resilient members 126 contact the inner surface 146.

The cover support structure 124 ensures a more efficient assembly process of the motor assembly since there is no need to stretch the convention rubber band around the motor housing. Cost reduction is also achieved since the one-piece over-molded cover support structure is less expensive than the separate, conventional rubber band.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An HVAC motor assembly comprising:
    a motor having a generally cylindrical housing having a closed end and an opened end disposed opposite the closed end, the motor including a brush card assembly comprising a brush card and a cover support structure coupled with the brush card, the brush card and cover support structure closing the opened end of the housing, said cover support structure having a plurality of resilient members extending from the opened end towards the closed end of the housing,
    a cover comprising a generally cylindrical section having an opening at one end thereof and a closed end opposite said one end, and an inner peripheral surface defining an interior between said ends, at least a portion of said motor being disposed in said interior so that a substantial portion of said housing is covered by the cover structure to reduce noise of the motor,
    said resilient members being constructed and arranged such the resilient members engage the inner peripheral surface of the cover to dampen vibration of said motor.

2. The motor assembly of claim 1, wherein said cover support structure includes a generally cylindrical base defining a central axis, the resilient members extending from the base generally in the direction of the central axis.

3. The motor of claim 1, wherein each resilient member is generally adjacent to an outer surface of the housing and is biased away from the outer surface of the housing.

4. The motor assembly of claim 2, wherein, in a relaxed condition, each resilient member extends from the base so as to be offset from a line parallel to the central axis by about 10 degrees.

5. The motor assembly of claim 2, wherein the base is connected to the brush card.

6. The motor assembly of claim 2, wherein each resilient member is of generally rectangular configuration and coupled to the base by a hinge connection.

7. The motor assembly of claim 1, wherein a surface of each resilient member has a plurality of grooves therein with a raised portion being disposed between pairs of grooves, the grooves and raised portions extending the entire length of each resilient member, with the raised portions contacting the inner peripheral surface of the cover structure.

8. The motor assembly of claim 1, wherein the cover support structure and the cover are composed of plastic.

9. A motor configured to have at least a portion thereof received in an interior of a cover to reduce noise of the motor, the interior being defined by an inner peripheral surface of the cover, the motor comprising:
    a generally cylindrical housing having a closed end and an opened end disposed opposite the closed end, and
    a brush card assembly comprising a brush card and a cover support structure coupled with the brush card, the brush card and cover support structure closing the opened end of the housing, said cover support structure having a plurality of resilient members extending from the opened end towards the closed end of the housing,
    said resilient members being constructed and arranged such that when at least a portion of the motor is placed in the interior of a cover, the resilient members engage the inner peripheral surface of the cover to dampen vibration of said motor.

10. The motor of claim 9, wherein said cover support structure includes a generally cylindrical base defining a central axis, the resilient members extending from the base generally in the direction of the central axis.

11. The motor of claim 9, wherein with each resilient member is generally adjacent to an outer surface of the housing and is biased away from the outer surface of the housing.

12. The motor of claim 10, wherein, in a relaxed condition, each resilient member extends from the base so as to be offset from the central axis an angle of about 10 degrees.

13. The motor of claim 10, wherein the base is connected to the brush card.

14. The motor of claim 10, wherein each resilient member is of generally rectangular configuration and coupled to the base by a hinge connection.

15. The motor of claim 9, wherein a surface of each resilient member has a plurality of grooves therein with a raised portion being disposed between pairs of grooves, the grooves and raised portions extending the entire length of each resilient member, with the raised portions contacting the inner peripheral surface of the cover structure.

16. The motor of claim 9, wherein the cover support structure and the cover are composed of plastic.

17. A method of assembling an HVAC motor assembly including the steps of:

providing a motor having a generally cylindrical housing having a closed end and an opened end disposed opposite the closed end, the motor including a brush card assembly comprising a brush card and a cover support structure coupled with the brush card, the brush card and cover support structure closing the opened end of the housing, said cover support structure having a plurality of resilient members extending from the opened end towards the closed end of the housing, and providing a cover comprising a generally cylindrical section having an opening at one end thereof and a closed end opposite said one end, and an inner peripheral surface defining an interior between said ends, placing at least a portion of said motor in said interior so that a substantial portion of said housing is covered by the cover to reduce noise of the motor, with said resilient members being engaged with the inner peripheral surface of the cover to dampen vibration of said motor.

* * * * *